(12) United States Patent
Tachibana (10) Patent No.: US 12,304,344 B2
(45) Date of Patent: May 20, 2025

(54) VEHICLE CONTROL DEVICE

(71) Applicant: SUZUKI MOTOR CORPORATION, Hamamatsu (JP)

(72) Inventor: Toshihide Tachibana, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 465 days.

(21) Appl. No.: 17/939,823

(22) Filed: Sep. 7, 2022

(65) Prior Publication Data

US 2023/0106645 A1    Apr. 6, 2023

(30) Foreign Application Priority Data

Oct. 1, 2021    (JP) .................................. 2021-162967

(51) Int. Cl.
*B60L 58/12* (2019.01)

(52) U.S. Cl.
CPC ........... *B60L 58/12* (2019.02); *B60L 2210/10* (2013.01)

(58) Field of Classification Search
CPC ................. B60L 58/12; B60L 2210/10; B60L 2240/547; B60L 3/003; B60L 2210/12; B60L 2240/80; B60L 58/20; B60L 2240/527; B60L 2250/10; Y02T 10/70; Y02T 10/72
USPC .......................................................... 320/109
See application file for complete search history.

(56) References Cited

U.S. PATENT DOCUMENTS

2022/0332206 A1* 10/2022 Murthy-Bellur ........ B60L 58/12

FOREIGN PATENT DOCUMENTS

JP        2016-010280 A        1/2016

\* cited by examiner

*Primary Examiner* — Paul Dinh
(74) *Attorney, Agent, or Firm* — Stein IP, LLC (57) ABSTRACT

There is provided a vehicle control device including: an inverter that is configured to drive an electric motor; a DC/DC converter that is configured to step down a voltage output from a high voltage battery; a pre-charge circuit including a pre-charge switch; a voltage detector that is configured to detect an input voltage input to the inverter and the DC/DC converter; and a controller. When the input voltage is lower than the input voltage at the time when pre-charge of the inverter is completed, the controller is configured to determine that power supplied from a power supply of the DC/DC converter to the DC/DC converter is not normally stopped.

3 Claims, 3 Drawing Sheets

VEHICLE CONTROL DEVICE

CROSS-REFERENCE TO RELATED APPLICATIONS

This application is based on Japanese Patent Application No. 2021-162967 filed on Oct. 1, 2021, the contents of which are incorporated herein by way of reference.

TECHNICAL FIELD

The present invention relates to a vehicle control device that controls an electric vehicle.

BACK GROUND

An electric vehicle such as an electric automobile or a hybrid vehicle includes an electric motor as a driving power source, a high voltage battery that outputs a high voltage for driving the electric motor, an in-vehicle device such as an electric or electronic device that operates at a low voltage of 12 V, a low voltage battery that supplies power to the in-vehicle device, and a vehicle control device that controls the electric vehicle.

The vehicle control device includes a direct current/direct current (DC/DC) converter that steps down the voltage of the high voltage battery to, for example, 12 V in order to charge an inverter that drives the electric motor and to charge the low voltage battery and to supply electric power to the in-vehicle device.

The vehicle control device further includes a main relay that switches the voltage input from the high voltage battery to the inverter and the DC/DC converter between on and off states, and a pre-charge circuit that pre-charges the inverter. The pre-charge circuit is provided with a pre-charge resistor that generates a pre-charge current by lowering a current value of a current from the high voltage battery, and a pre-charge relay that switches the input of the pre-charge current to the inverter between on and off states.

The vehicle control device includes a voltage detection circuit that detects an input voltage input from the high voltage battery to the inverter and the DC/DC converter, and a controller that performs various controls related to the electric vehicle. The controller performs open and close switching control of the main relay, open and close switching control of the pre-charge relay, operation and stop switching control of the inverter, operation and stop switching control of the DC/DC converter, and the like.

In the vehicle control device, the inverter and the DC/DC converter are connected in parallel to the high voltage battery. The main relay and the pre-charge circuit are connected in parallel with each other on the way of a path through which the high voltage battery is connected to the inverter and the DC/DC converter.

When the main relay is open and the pre-charge relay is closed, the pre-charge current is input from the high voltage battery to the inverter via the pre-charge circuit. On the other hand, when the main relay is closed and the pre-charge relay is open, a drive current required for the operation of the inverter is input from the high voltage battery to the inverter. Further, when either the main relay or the pre-charge relay is closed, the voltage output from the high voltage battery is input to the inverter and the DC/DC converter.

Further, the voltage from the high voltage battery is input to the DC/DC converter in order to lower the voltage of the high voltage battery, but separately, power is supplied from the low voltage battery to the DC/DC converter for the operation of the DC/DC converter. The DC/DC converter includes an operation control circuit that controls the DC/DC converter itself. The operation control circuit has a function of switching the DC/DC converter between receiving and not receiving the power from the low voltage battery.

The controller controls the operation and stop switching of the DC/DC converter by controlling the operation control circuit of the DC/DC converter. Specifically, the controller outputs an operation control signal to the DC/DC: converter. For example, the operation control circuit of the DC/DC converter changes a state of the DC/DC converter to a state of receiving the power from the low voltage battery when a voltage level of the operation control signal output from the controller is a first level. Then, the DC/DC converter operates. On the other hand, when the voltage level of the operation control signal output from the controller is a second level, the operation control circuit of the DC/DC converter changes the state of the DC/DC converter to a state of cutting off the power supplied from the low voltage battery. Then, the DC/DC converter stops.

The vehicle control device having the above configuration operates as follows. The controller is in an idle state while a power switch of the vehicle is in an off state. While the power switch of the vehicle is in the off state, the operation control circuit of the DC/DC converter sets the state of the DC/DC: converter to the state where the power supplied from the low voltage battery is cut off, according to the second level operation control signal output from the controller in the idle state to the DC/DC converter. Then, the DC/DC converter stops. The inverter stops while the power switch of the vehicle is in the off state, and both the main relay and the pre-charge relay are open.

When the power switch of the vehicle is in an on state, the controller is in the active state. The controller doses the pre-charge relay while keeping the main relay open. Then, the pre-charge current is input from the high voltage battery to the inverter via the pre-charge circuit, and the inverter is pre-charged.

When the pre-charge of the inverter is completed, the input voltage input from the high voltage battery to the inverter becomes substantially equal to a normal discharge voltage of the high voltage battery. The controller recognizes the input voltage input from the high voltage battery to the inverter based on a detection signal output from the voltage detection circuit, and recognizes that the pre-charge of the inverter is completed. The controller then closes the main relay and opens the pre-charge relay.

Then, the controller switches the voltage level of the operation control signal output to the DC/DC converter from the second level to the first level. As a result, the operation control circuit of the DC/DC converter changes the state of the DC/DC converter to a state of receiving the power supplied from the low voltage battery. As a result, the DC/DC converter starts operating and operates to step down the voltage output from the high voltage battery. Then, the voltage stepped down by the DC/DC converter charges the low voltage battery and supplies electric power to the in-vehicle device. The controller makes the inverter operate.

The controller then opens the main relay when the power switch of the vehicle is in the off state. As a result, the input of the drive current from the high voltage battery to the inverter is stopped, and the input voltages of the inverter and the DC/DC converter are both zero. Subsequently, the controller switches the voltage level of the operation control signal output, to the DC/DC converter from the first level to the second level. As a result, the operation control circuit of the DC/DC converter changes the state of the DC/DC converter to the state where the power supplied from the low voltage battery is cut off. As a result, the DC/DC converter stops, and the charge of the low voltage battery and the power supply to the in-vehicle device is stopped. The controller stops the inverter.

The following Patent Literature 1 describes a device similar to the above vehicle control device.

Patent Literature 1: JP-A-2016-10280

In the above vehicle control device, when the power switch of the vehicle is in the off state, the operation control circuit of the DC/DC converter sets the state of the DC/DC converter to the state where the power supplied from the low voltage battery is cut off, according to the operation control signal output from the controller. As a result, the power supplied from the low voltage battery to the DC/DC converter is stopped. However, an abnormality may occur in which the power supplied from the low voltage battery to the DC/DC converter is not stopped even when the power switch of the vehicle is in the off state.

For example, in the operation control circuit of the DC/DC converter, when the operation control signal output from the controller is at a ground level, the state of the DC/DC converter is set to the state of receiving the power supplied from the low voltage battery, and when the operation control signal output from the controller is at a non-ground level, the state of the DC/DC converter is set to the state where the power supplied from the low voltage battery is cut off. In this case, when a path for sending the operation control signal from the controller to the DC/DC converter is grounded for some reason, the operation control signal of the ground level is constantly input to the DC/DC converter. Therefore, the DC/DC converter cannot cut off the power supplied from the low voltage battery according to the operation control signal from the controller. As a result, even when the power switch is in the off state, the power supplied from the low voltage battery to the DC/DC converter is continued.

While the power switch is in the off state, the voltage of the high voltage battery is not input to the DC:/DC converter because both the main relay and the pre-charge relay are open. Therefore, even when the DC/DC converter is supplied with power from the low voltage battery, the DC/DC converter does not perform the step-down operation. However, the DC/DC converter in this state consumes power from the low voltage battery, although the amount of the consumed power is smaller than that in the step-down operation. Such power consumption is wasteful and needs to be reduced. Therefore, it is required to detect the abnormality that the power supplied from the low voltage battery to the DC/DC converter does not stop even when the power switch of the vehicle is in the off state.

In this regard, it is conceivable to add a circuit hardware) that detects this abnormality. However, adding such a circuit is not preferable due to an increase in manufacturing cost.

The present invention is made in view of, for example, the above problems, and an object thereof is to provide a vehicle control device that can inexpensively detect that the power supply to the DC/DC converter is not normally stopped.

SUMMARY

In order to solve the above problem, the present invention is characterized in a vehicle control device that is configured to control an electric vehicle, the electric vehicle including an electric motor that is a driving power source, a high voltage battery that is configured to output a high voltage for driving the electric motor, an in-vehicle device that is configured to operate at a low voltage, and a low voltage battery that is configured to output the low voltage for operating the in-vehicle device. The vehicle control device includes: an inverter that is configured to drive the electric motor using a voltage output from the high voltage battery; a DC/DC converter that is configured to step down the voltage output from the high voltage battery and that is configured to output a voltage used for charging the low voltage battery or operating the in-vehicle device; a main switch that is configured to switch an input of the voltage output from the high voltage battery to the inverter and the DC/DC converter between on and off states; a pre-charge circuit including a pre-charge current generator that is configured to generate a pre-charge current using a current output from the high voltage battery, and a pre-charge switch that is configured to switch an input of the pre-charge current to the inverter between on and off states; a voltage detector that is configured to detect an input voltage input from the high voltage battery to the inverter and the DC/DC converter; and a controller that is configured to input the pre-charge current to the inverter to start pre-charge of the inverter by setting the main switch to the off state and the pre-charge switch to the on state, and that is configured to set the main switch to the on state and the pre-charge switch to the off state after the pre-charge of the inverter is completed. The inverter and the DC/DC converter are connected to the high voltage battery in parallel with each other. The main switch and the pre-charge circuit are connected in parallel with each other on the way of a path through which the high voltage battery is connected to the inverter and the DC/DC converter. After the pre-charge of the inverter is completed, the controller is configured to determine whether the input voltage detected by the voltage detector is lower than the input voltage input from the high voltage battery to the inverter and the DC/DC converter at a time when the pre-charge of the inverter is completed before the main switch is set to the on state and the pre-charge switch is set to the off state. When the input voltage detected by the voltage detector is lower than the input voltage input from the high voltage battery to the inverter and the DC/DC converter at the time when the pre-charge of the inverter is completed, the controller is configured to determine that power supplied from a power supply of the DC/DC converter to the DC/DC converter is not normally stopped.

DESCRIPTION OF EMBODIMENTS

A vehicle control device according to an embodiment of the present invention is a vehicle control device that controls an electric vehicle, including an electric motor that is a driving power source, a high voltage battery that outputs a high voltage for driving the electric motor, an in-vehicle device that operates at a low voltage, and a low voltage battery that outputs a low voltage for operating the in-vehicle device.

The vehicle control device according to the present embodiment includes an inverter, a DC/DC converter, a main switch, a pre-charge circuit, a voltage detector, and a controller.

The inverter is a circuit that drives the electric motor using a voltage output from the high voltage battery. The DC/DC converter is a circuit that steps down the voltage output from the high voltage battery and outputs a voltage used for charging the low voltage battery or operating the in-vehicle device.

The main switch is a switch that switches an input of the voltage output from the high voltage battery to the inverter and the DC/DC converter between on and off states. The pre-charge circuit is a circuit that pre-charges the inverter. The pre-charge circuit includes a pre-charge current generator that generates a pre-charge current using a current output from the high voltage battery, and a pre-charge switch that switches an input of the pre-charge current to the inverter between on and off states.

The voltage detector is a circuit that detects an input voltage input from the high voltage battery to the inverter and the DC/DC converter.

The controller has a function of inputting the pre-charge current to the inverter to start pre-charge of the inverter by setting the main switch to the off state and the pre-charge switch to the on state, and after the pre-charge of the inverter is completed, setting the main switch to the on state and the pre-charge switch to the off state.

In the vehicle control device according to the present embodiment, the inverter and the DC/DC converter are connected in parallel to the high voltage battery. The main switch and the pre-charge circuit are connected in parallel with each other on the way of a path through which the high voltage battery is connected to the inverter and the DC/DC converter.

After the pre-charge of the inverter is completed, the controller determines whether the input voltage detected by the voltage detector is lower than the input voltage input from the high voltage battery to the inverter and the DC/DC converter at a time when the pre-charge of the inverter is completed before the main switch is set to the on state and the pre-charge switch is set to the off state, and when the input voltage detected by the voltage detector is lower than the input voltage input from the high voltage battery to the inverter and the DC/DC converter at the time when the pre-charge of the inverter is completed, the controller determines that power supplied from a power supply of the DC/DC converter to the DC/DC converter is not normally stopped.

In the vehicle control device according to the present embodiment, for example, when a power switch of the electric vehicle is set to an on state, the controller inputs the pre-charge current to the inverter to start pre-charge of the inverter by setting the main switch to the off state and the pre-charge switch to the on state. As a result, the input voltages of the inverter and the DC/DC converter connected to the high voltage battery in parallel with the inverter gradually increase, and when the pre-charge of the inverter is completed, the input voltages are substantially equal to a normal discharge voltage of the high voltage battery.

After the pre-charge of the inverter is completed, almost no pre-charge current flows into the inverter. Further, when the power supplied from the power supply of the DC/DC converter to the DC/DC converter is normally stopped, the DC/DC converter is stopped when the power switch of the electric vehicle set to an off state. When the power switch of the electric vehicle is set to the on state, the pre-charge of the inverter is performed, and the DC/DC converter remains stopped when the pre-charge of the inverter is completed. When the DC/DC converter is stopped after the pre-charge of the inverter is completed, almost no pre-charge current flows into the DC/DC converter. The state where almost no pre-charge current flows into the inverter and the DC/DC converter is maintained by keeping the main switch in the off state and the pre-charge switch in the on state. As a result, after the pre-charge of the inverter is completed, the state where the input voltages of the inverter and the DC/DC converter are substantially equal to a normal discharge voltage of the high voltage battery is maintained by keeping the main switch in the off state and the pre-charge switch in the on state.

On the other hand, when the power supplied from the power supply of the DC/DC converter to the DC/DC converter is not normally stopped, the DC/DC converter is not stopped when the power switch of the electric vehicle is set to the off state. Then, even when the power switch of the electric vehicle is set to the on state, the pre-charge of the inverter is performed, and the pre-charge of the inverter is completed, the DC/DC converter is not stopped. In this case, when the input voltages of the inverter and the DC/DC converter reaches an input voltage at which the DC/DC converter can perform step-down operation during the pre-charge of the inverter, and then a certain period of time elapses, the step-down operation is performed in the DC/DC converter. As a result, the pre-charge current flows into the DC/DC converter. A time when the pre-charge current flows into the DC/DC converter is usually after the completion of the pre-charge. As a result, the input voltages of the inverter and the DC/DC converter become substantially equal to a normal discharge voltage of the high voltage battery once when the pre-charge of the inverter is completed, and then decrease.

To summarize the above, when the power supplied from the power supply of the DC/DC converter to the DC/DC converter is normally stopped, after the completion of the pre-charge of the inverter, a level of the input voltages of the inverter and the DC/DC converter is maintained at a level at the completion of the pre-charge of the inverter while the main switch is kept in the off state and the pre-charge switch is kept in the on state. On the other hand, when the power supplied from the power supply of the DC/DC converter to the DC/DC converter is not normally stopped, after the completion of the pre-charge of the inverter, the level of the input voltages of the inverter and the DC/DC converter is lower than the level at the completion of the pre-charge of the inverter while the main switch is kept in the off state and the pre-charge switch is kept in the on state.

After the pre-charge of the inverter is completed, the controller determines whether the input voltage detected by the voltage detector is lower than the input voltage input from the high voltage battery to the inverter and the DC/DC converter at the time when the pre-charge of the inverter is completed before the main switch is set to the on state and the pre-charge switch is set to the off state. Therefore, the controller can determine whether the power supplied from the power supply of the DC/DC converter to the DC/DC converter is normally stopped.

This determination can be implemented by using the voltage detector, as a means for determining the completion of the pre-charge, provided in the existing vehicle control device, and by adding or changing a computer program executed by the controller. That is, this determination can be implemented by adding or changing software to the existing vehicle control device, and in implementing this determination, there is no need to add new hardware to the existing vehicle control device. Therefore, according to the vehicle control device of the present embodiment, it is possible to inexpensively detect whether the power supply to the DC/DC converter is normally stopped.

Embodiment

Hereinafter, an embodiment of the vehicle control device of the present invention will be described.
(Vehicle Control Device)

Figure 1:
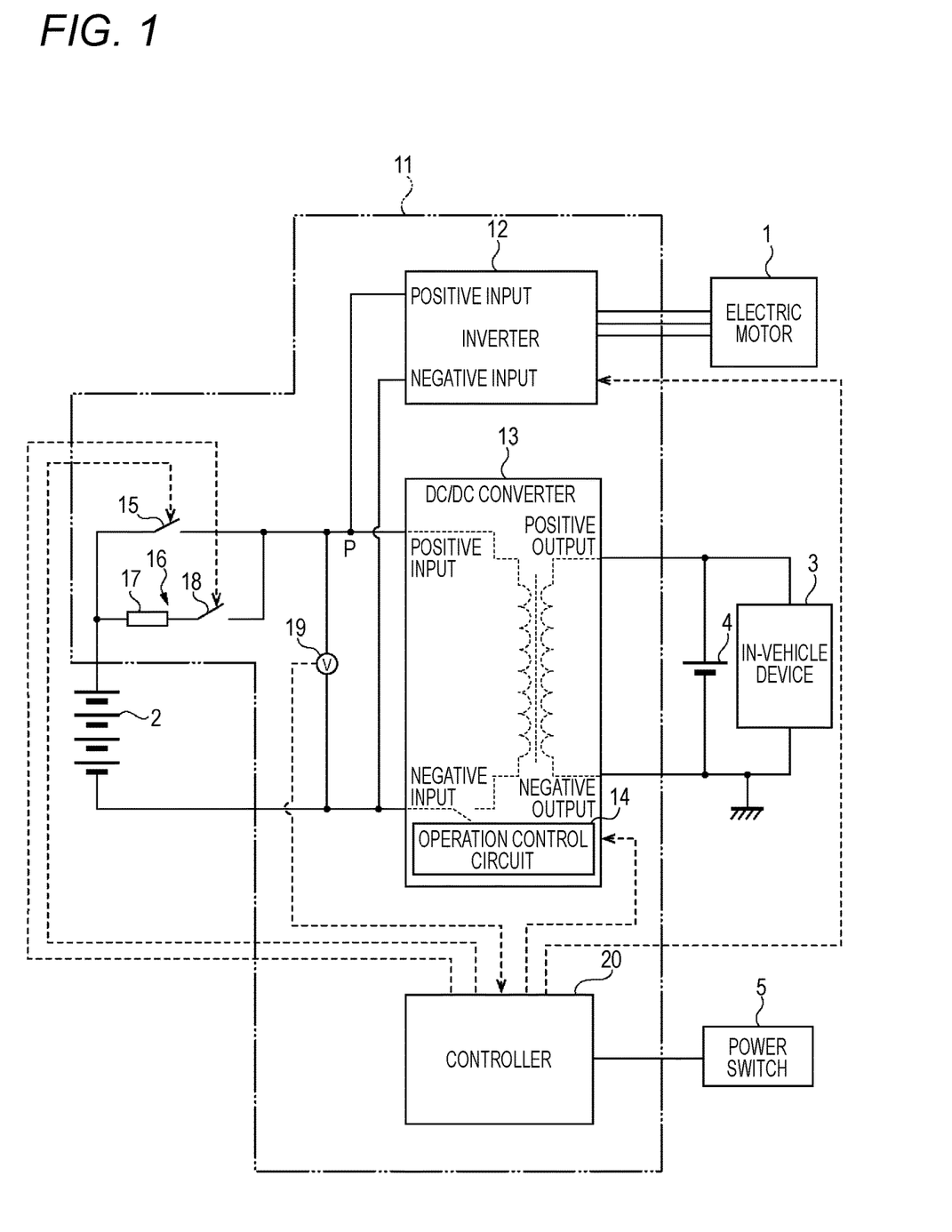
FIG. 1 is a circuit diagram showing an electric motor, a high voltage battery, an in-vehicle device, a low voltage battery, and a vehicle control device according to an embodiment of the present invention.

FIG. 1 is a circuit diagram showing a vehicle control device 11 and the like according to an embodiment of the present invention. The vehicle control device 11 is a device that controls a vehicle. The vehicle is an automobile that uses an electric motor as a driving power source, and is, for example, an electric automobile, a fuel cell automobile, a hybrid vehicle, or the like. The vehicle is an automatic four-wheel vehicle, a motor tricycle, a motorcycle, or the like.

As shown in FIG. 1, the vehicle is provided with an electric motor 1, a high voltage battery 2, an in-vehicle device 3, a low voltage battery 4, a power switch 5 of the vehicle, and the vehicle control device 11. The electric motor 1 is a driving power source of the vehicle. The high voltage battery 2 is a storage battery that outputs a voltage for driving the electric motor 1. A nominal voltage of the high voltage battery 2 is, for example, 100 V to 500 V or higher. The in-vehicle device 3 is an electric or electronic device that operates at a low voltage (for example, 12 V). The low voltage battery 4 is a storage battery that outputs a voltage for operating the in-vehicle device 3. A nominal voltage of the low voltage battery 4 is, for example, 12 V The power switch 5 is a switch for a user to set an entire power supply of the vehicle to an on state or an off state.

The vehicle control device 11 includes an inverter 12, a DC/DC converter 13, a main relay 15 as the main switch, a pre-charge circuit 16, a voltage detector 19, and a controller 20. The inverter 12 and the DC/DC converter 13 are connected to the high voltage battery 2 in parallel with each other. The main relay 15 and the pre-charge circuit 16 are connected in parallel with each other on the way of a path through which a positive terminal of the high voltage battery 2 is connected to a positive input terminal of the inverter 12 and a positive input terminal of the DC/DC converter 13 (between the positive terminal of the high voltage battery 2 and a point P). The electric motor 1 is connected to an output side of the inverter 12. The in-vehicle device 3 and the low voltage battery 4 are connected to an output side of the DC/DC converter 13. The controller 20 is connected to a control terminal of the main relay 15, a control terminal of a pre-charge relay 18 of the pre-charge circuit 16, a control terminal of the DC/DC converter 13, a control terminal of the inverter 12, and the voltage detector 19. The power switch 5 of the vehicle is connected to the controller 20.

The inverter 12 is a circuit that controls driving of the electric motor 1 using power output from the high voltage battery 2.

The DC/DC converter 13 is a circuit that steps down a voltage output from the high voltage battery 2 and outputs a voltage used for charging the low voltage battery 4 and operating the in-vehicle device 3.

A power source of the DC/DC converter 13 is the low voltage battery 4. The DC/DC converter 13 operates by receiving power supplied from the low voltage battery 4, The DC/DC converter 13 includes an operation control circuit 14 that controls the DC/DC converter 13 itself. The operation control circuit 14 has a function of switching the DC/DC converter 13 between receiving and not receiving the power supplied from the low voltage battery 4. The DC/DC converter 13 includes a control terminal for controlling the operation control circuit 14 by the controller 20. An operation control signal output from the controller 20 is input to the control terminal. The operation control circuit 14 switches the DC/DC converter 13 between receiving and not receiving the power supplied from the low voltage battery 4 according to the operation control signal.

The operation control circuit 14 sets a state of the DC/DC converter 13 to a state of receiving the power supplied from the low voltage battery 4 when a voltage level of the operation control signal is a ground level. As a result, the DC/DC converter 13 operates. On the other hand, the operation control circuit 14 sets the state of the DC/DC converter 13 to a state where the power supplied from the low voltage battery 4 is cut off when the voltage level of the operation control signal is a non-grounded level. As a result, the DC/DC converter 13 is stopped.

The main relay 15 is a switch that switches an input of the voltage output from the high voltage battery 2 to the inverter 12 and the DC/DC converter 13 between on and off states. The pre-charge circuit 16 is a circuit for performing pre-charge of the inverter 12, The pre-charge of the inverter 12 is a process of charging an input current smoothing capacitor provided in the inverter 12 when the voltage input from the high voltage battery 2 to the inverter 12 is started, and the like. The pre-charge circuit 16 includes a pre-charge resistor 17 as the pre-charge current generator and a pre-charge relay 18 as the pre-charge switch. The pre-charge resistor 17 is a resistor that generates the pre-charge current by lowering a current value of a current output from the high voltage battery 2, The pre-charge relay 18 is a switch that switches an input of the pre-charge current to the inverter 12 between on and off states.

The voltage detector 19 detects an input voltage input from the high voltage battery 2 to the inverter 12 and the DC/DC converter 13. Since the inverter 12 and the DC/DC converter 13 are connected to the high voltage battery 2 in parallel with each other, an input voltage of the inverter 12 and an input voltage of the DC/DC converter 13 are equal to each other.

The controller 20 includes a central processing unit (CPU), a memory, and the like. The controller 20 is in an active state (normal operating state) when the power switch 5 of the vehicle is in the on state, and is in an idle state (power-saving operating state) when the power switch 5 of the vehicle is in the off state. The controller 20 outputs a main relay control signal to the main relay 15 and controls to open and close the main relay 15. The controller 20 outputs a pre-charge relay control signal to the pre-charge relay 18 and controls to open and close the pre-charge relay 18. The controller 20 outputs the operation control signal to the DC/DC converter 13 and controls the operation control circuit 14 of the DC/DC converter 13. The controller 20 outputs another operation control signal to the inverter, and controls to operate and stop the inverter 12. Further, the controller 20 can recognize the input voltage of the inverter 12 and the DC/DC converter 13 based on a detection result of the voltage detector 19. The controller 20 can also perform timekeeping.

Normally, after the power switch 5 of the vehicle is set to the on state, the pre-charge of the inverter 12 is completed, and the main relay 15 is closed and the pre-charge relay 18 is opened, the controller 20 sets the voltage level of the operation control signal to the ground level while the power switch 5 is in the on state. As a result, the operation control circuit 14 of the DC/DC converter 13 sets the state of the DC/DC converter 13 to the state of receiving the power supplied from the low voltage battery 4. On the other hand, the controller 20 sets the voltage level of the operation control signal to the non-grounded level while the power switch 5 of the vehicle is set to the off state. As a result, the operation control circuit 14 of the DC/DC converter 13 sets the state of the DC/DC converter 13 to the state where the power supplied from the low voltage battery 4 is cut off.

The controller 20 also has a function of detecting occurrence of an abnormality that the power supplied from the low voltage battery 4 to the DC/DC converter 13 does not stop even when the power switch 5 of the vehicle is set to the off state (hereinafter, referred to as an "abnormality in the DC/DC converter 13"). The abnormality in the DC/DC converter 13 occurs when a path for sending the operation control signal from the controller 20 to the DC/DC converter 13 is grounded for some reason, or the like. When the path for sending the operation control signal from the controller 20 to the DC/DC converter 13 is grounded, the operation control signal of the ground level is constantly input to the DC/DC converter 13, Therefore, the DC/DC converter 13 cannot cut off the power supplied from the low voltage battery 4 according to the operation control signal from the controller 20. As a result, even when the power switch 5 of the vehicle is in the off state, the power supplied from the low voltage battery 4 to the DC/DC converter 13 is continued.

While the power switch 5 is in the off state, the voltage of the high voltage battery 2 is not input to the DC/DC converter 13 since both the main relay 15 and the pre-charge relay 18 are open. Therefore, even when the DC/DC converter 13 is supplied with power from the low voltage battery 4, the DC/DC converter 13 does not perform the step-down operation.

However, the DC/DC converter 13 in this state consumes power from the low voltage battery 4, although the amount of the consumed power is smaller than that in the step-down operation. The controller 20 can detect the occurrence of such an abnormality in the DC/DC converter 13 and notify the user of the occurrence of an abnormality in the DC/DC converter 13.

(Principle of Detection of Abnormality of DC/DC Converter)

A principle of detection of the abnormality in the DC/DC converter 13 by the controller 20 will be described. The controller 20 performs the pre-charge of the inverter 12 when the power switch 5 of the vehicle is in the on state. The controller 20 detects the occurrence of the abnormality in the DC/DC converter 13 when performing the pre-charge of the inverter 12.

Figure 2A:
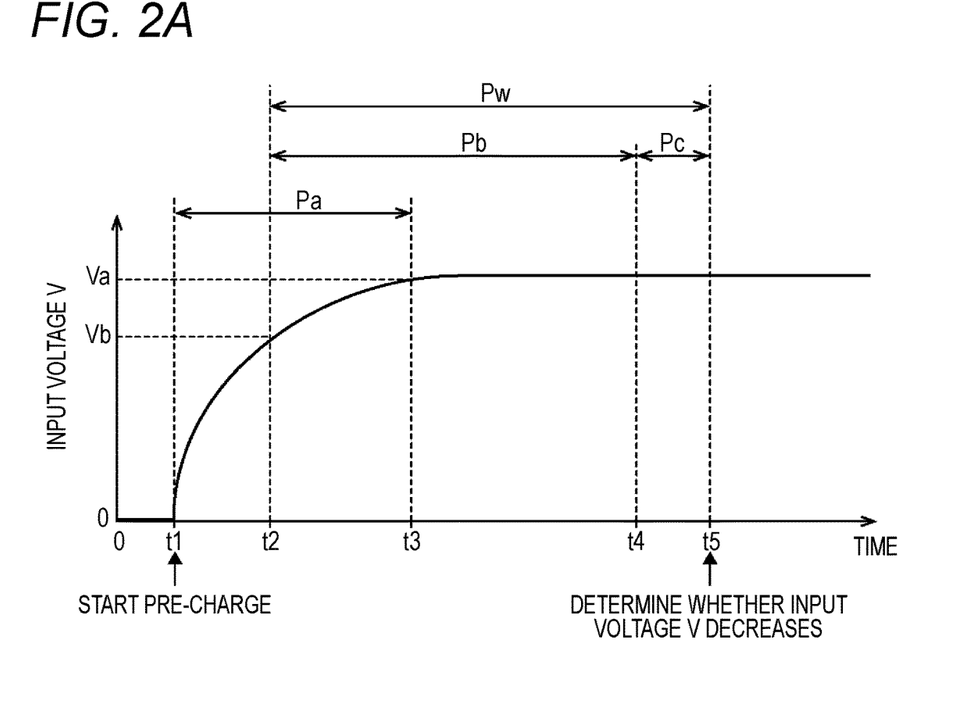
FIGS. 2A and 2B is a characteristic diagram showing changes in input voltages of an inverter and a DC/DC converter during pre-charge in the vehicle control device according to the embodiment of the present invention.
Figure 2B:
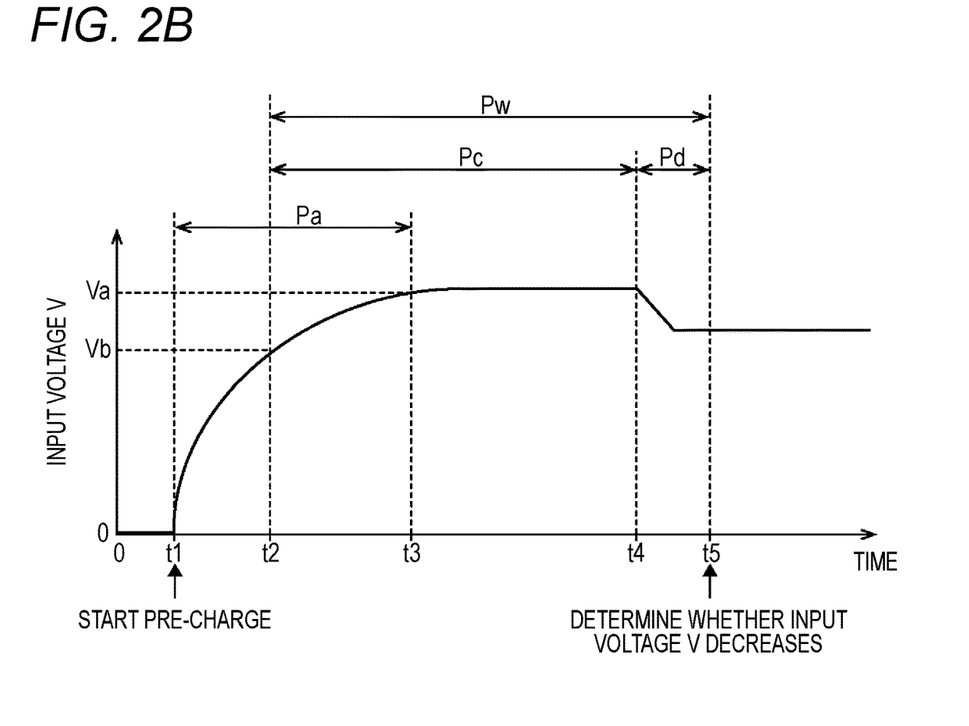

FIG. 2A shows a change in the input voltage of the inverter 12 and the DC/DC converter 13 at the time of pre-charge when abnormality in the DC/DC converter 13 does not occur. FIG. 2B shows a change in the input voltage of the inverter 12 and the DC/DC converter 13 at the time of pre-charge when an abnormality in the DC/DC converter 13 occurs. Hereinafter, the input voltage of the inverter 12 and the DC/DC converter 13 is referred to as an "input voltage V".

First, some terms used to explain the principle of detection of the abnormality in the DC/DC converter will be described.

A reference voltage used when determining whether the pre-charge of the inverter 12 is completed based on the input voltage V is called a "pre-charge completion reference voltage". The pre-charge completion reference voltage is set to, for example, a lower limit value of a normal discharge voltage of the high voltage battery 2. Va in FIGS. 2A and 2B indicates the pre-charge completion reference voltage. The lower limit value of a normal discharge voltage of the high voltage battery 2 is, for example, a value lower than the nominal voltage of the high voltage battery 2 but higher than a discharge end voltage.

A time required from a start to the completion of the pre-charge of the inverter 12 is referred to as a "pre-charge required time". Pa in FIGS. 2A and 2B indicates the pre-charge required time.

A lower limit value of the input voltage of the DC/DC converter 13 at which the DC/DC converter 13 is capable of stepping down the input voltage and outputting the stepped-down voltage (step-down operation) is referred to as a "step-down operation lower limit voltage". Vb in FIGS. 2A and 2B indicates the step-down operation lower limit voltage. The step-down operation lower limit voltage Vb is lower than the pre-charge completion reference voltage Va.

A time required from inputting a voltage equal to or higher than the step-down operation lower limit voltage Vb to the DC/DC converter 13 in a state where no voltage equal to or higher than the step-down operation lower limit voltage Vb is input, to the DC/DC converter 13 stepping down the input voltage and outputting the stepped down voltage is referred to as a "time required to start step-down operation". For example, the time required to start step-down operation is set based on data obtained by conducting a test or the like in advance. Pb in FIG. 2A indicates the time required to start step-down operation.

Next, with reference to FIG. 2A, the change in the input voltage V when an abnormality in the DC/DC converter 13 does not occur will be described. The pre-charge of the inverter 12 is started when the main relay 15 is open and the pre-charge relay 18 is closed. During the pre-charge, the inverter 12 is stopped or is in an operation standby state. In FIG. 2A, when the pre-charge of the inverter 12 is started at a time point t1, the pre-charge current flows into the inverter 12. Then, the input voltage V of the inverter 12 and the DC/DC converter 13 gradually increases and reaches the step-down operation lower limit voltage Vb at a time point t2. Then, the input voltage V further increases and reaches the pre-charge completion reference voltage Va at a time point t3. When the input voltage V reaches the pre-charge completion reference voltage Va, the pre-charge of the inverter 12 is completed. When the pre-charge of the inverter 12 is completed, the pre-charge current hardly flows into the inverter 12 in a stopped state or the operation standby state. As described above, the controller 20 sets the voltage level of the operation control signal to the non-ground level while the power switch 5 of the vehicle is in the off state. As a result, the operation control circuit 14 of the DC/DC converter 13 sets the state of the DC/DC converter 13 to the state where the power supplied from the low voltage battery 4 is cut off. As a result, the DC/DC converter 13 is stopped while the power switch 5 of the vehicle is in the off state. Therefore, even when the power switch 5 of the vehicle is switched from the off state to the on state, unless the controller 20 changes the voltage level of the operation control signal from the non-ground level to the ground level, the state where the power supplied from the low voltage battery 4 to the DC/DC converter 13 is cut off is maintained, and the DC/DC converter 13 remains stopped. The pre-charge current hardly flows into the stopped DC/DC converter 13 (precisely, since a smoothing capacitor is provided on an input side of the DC/DC converter 13, the pre-charge current flows into the stopped DC/DC converter 13 when the pre-charge of the inverter 12 is started, but when the pre-charge of the inverter 12 is completed, the pre-charge current hardly flows into the stopped DC/DC converter 13). Therefore, after the time point t3, as long as the main relay 15 is open, the pre-charge relay 18 is closed, the inverter 12 is in the stopped state or the operation standby state, and the DC/DC converter 13 is in the stopped state, the input voltage V is substantially constant.

Next, with reference to FIG. 2B, the change in the input voltage V of the inverter 12 and the DC/DC converter 13 during the pre-charge when an abnormality in the DC/DC converter 13 occurs will be described. In FIG. 2B, after the pre-charge of the inverter 12 is started at the time point H, the input voltage V of the inverter 12 and the DC/DC converter 13 gradually increases and reaches the step-down operation lower limit voltage Vb at the time point t2. Then, the input voltage V further increases and reaches the pre-charge completion reference voltage Va at the time point t3. When the input voltage V reaches the pre-charge completion reference voltage Va, the pre-charge of the inverter 12 is completed. When the pre-charge of the inverter 12 is completed, the pre-charge current hardly flows into the inverter 12 in the stopped state or the operation standby state. However, when an abnormality in the DC/DC converter 13 occurs, the control to the DC/DC converter 13 (operation control circuit 14) by the controller 20 becomes ineffective, and even after the power switch 5 of the vehicle is set to the off state, the power supplied from the low voltage battery 4 to the DC/DC converter 13 continues. Even after the power switch 5 of the vehicle is switched from the off state to the on state and the pre-charge of the inverter 12 is started, the power supplied from the low voltage battery 4 to the DC/DC converter 13 continues. In this case, even during the pre-charge of the inverter 12, when a voltage equal to or higher than the step-down operation lower limit voltage Vb is input from the high voltage battery 2 to the DC/DC converter 13, the DC/DC converter 13 steps down the input voltage and outputs the stepped-down voltage after the time required to start step-down operation Pb elapses. When the DC/DC converter 13 is in such a state, the pre-charge current flows into the DC/DC converter 13. As a result, the input voltage V decreases after a time point t4.

By comparing 2A and FIG. 2B, the following two points can be understood. First, when an abnormality in the DC/DC converter 13 does not occurs, the input voltage V at the time point t3 when the pre-charge is completed is maintained even after the time point t4, as shown in FIG. 2A. On the other hand, when an abnormality in the DC/DC converter 13 occurs, the input voltage V after the time point t4 is lower than the input voltage V at the time point t3 when the pre-charge is completed, as shown in FIG. 2B. Second, after the pre-charge is started at the time point t1, the input voltage V reaches the step-down operation lower limit voltage Vb at the time point t2, and at the time point t4 when the time required to start step-down operation Pb elapsed from the time point t2, the pre-charge required time Pa has already passed. Therefore, the pre-charge of the inverter 12 is completed. From these two points, after the pre-charge of the inverter 12 is started, after the time required to start step-down operation Pb elapses from the time when the input voltage V reaches the step-down operation lower limit voltage Vb, it is possible to detect whether an abnormality in the DC/DC converter 13 occurs by determining whether the input voltage V is lower than the input voltage V at the completion of the pre-charge of the inverter 12.

The controller 20 detects the occurrence of an abnormality in the DC/DC converter 13 based on the above principle of detection of the abnormality in the DC/DC converter 13. Specifically, after the pre-charge of the inverter 12 is started, the controller 20 determines whether the input voltage V is lower than the pre-charge completion reference voltage Va at a time point t5 when a determination standby time Pw elapses from the time when the input voltage V reaches the step-down operation lower limit voltage Vb. The determination standby time Pw is a time obtained by adding an additional time Pc to the time required to start step-down operation Pb. The additional time Pc is a margin for reliably capturing a decrease in the input voltage V after the elapse of the time required to start step-down operation Pb when an abnormality in the DC/DC converter 13 occurs. The controller 20 determines at the time point t5 whether the input voltage V is lower than the input voltage V at the time when the pre-charge of the inverter 12 is completed by comparison between the input voltage V at the time point t5 and the pre-charge completion reference voltage Va When the input voltage V is not lower than the pre-charge completion reference voltage Va at the time point t5, it can be determined that an abnormality in the DC/DC converter 13 does not occur. When the input voltage V is lower than the pre-charge completion reference voltage Va at the time point t5, it can be determined that an abnormality in the DC/DC converter 13 occurs.

(Vehicle Starting Process)

Figure 3:
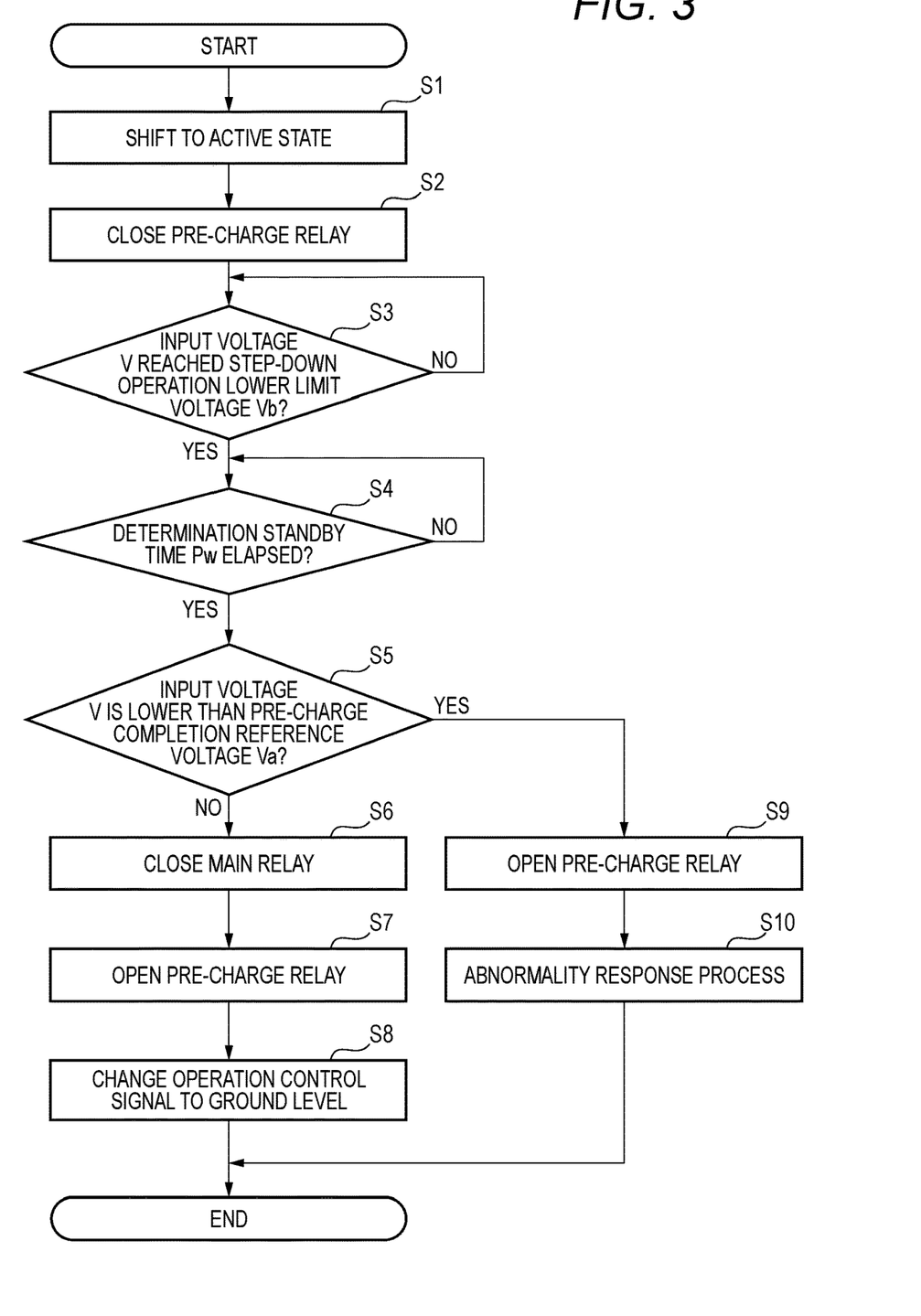
FIG. 3 is a flowchart showing a vehicle starting process in a controller of the vehicle control device according to the embodiment of the present invention.

The controller 20 performs an abnormality detection process with respect to the DC/DC converter 13 in a vehicle starting process including a pre-charge process of the inverter 12. FIG. 3 shows the vehicle starting process.

In FIG. 3, when the power switch 5 of the vehicle is in the off state, the controller 20 is in the idle state. Both the main relay 15 and the pre-charge relay 18 are open. Further, when an abnormality in the DC/DC converter 13 does not occur, the voltage level of the operation control signal is the non-ground level. The inverter is stopped.

When the power switch 5 of the vehicle is in the on state, the controller 20 shifts from the idle state to the active state (step S1). When the controller needs to set the inverter 12 to the operation standby state for pre-charge, the inverter 12 is set to the operation standby state.

Subsequently, the controller 20 closes the pre-charge relay 18 while keeping the main relay 15 open (step S2). As a result, the pre-charge of the inverter 12 is started.

Subsequently, the controller 20 determines whether the input voltage V (input voltage of the inverter 12 and the DC/DC converter 13) detected by the voltage detector 19 reaches the step-down operation lower limit voltage Vb (step S3).

When the input voltage V detected by the voltage detector 19 does not reach the step-down operation lower limit voltage Vb (step S3: NO), the controller 20 waits for the input voltage V detected by the voltage detector 19 to reach the step-down operation lower limit voltage Vb while repeatedly determining whether the input voltage V detected by the voltage detector 19 reaches the step-down operation lower limit voltage Vb.

When the input voltage V detected by the voltage detector 19 reaches the step-down operation lower limit voltage Vb (step S3: YES), the controller 20 waits for the determination standby time Pw to elapse from the time when the input voltage V detected by the voltage detector 19 reaches the step-down operation lower limit voltage Vb (step S4).

When the determination standby time Pw elapses from the time when the input voltage V detected by the voltage detector 19 reaches the step-down operation lower limit voltage Vb (step S4: YES), the controller 20 determines whether or not the input voltage V detected by the voltage detector 19 is lower than the pre-charge completion reference voltage Va (step S5).

As described above, when an abnormality in the DC/DC converter 13 does not occur, the input voltage V detected by the voltage detector 19 is not lower than the pre-charge completion reference voltage Va The pre-charge of the inverter 12 is completed when the determination standby time Pw elapses from the time when the input voltage V detected by the voltage detector 19 reaches the step-down operation lower limit voltage Vb. When the input voltage V detected by the voltage detector 19 is not lower than the pre-charge completion reference voltage Va (step S5: NO), the controller 20 closes the main relay 15 (step S6), and then opens the pre-charge relay 18 (step S7).

Subsequently, the controller 20 changes the voltage level of the operation control signal from the non-ground level to the ground level (step S8). As a result, the operation control circuit 14 of the DC/DC converter 13 sets the state of the DC/DC converter 13 to the state of receiving the power supplied from the low voltage battery 4. As a result, the DC/DC converter 13 starts operation and performs the step-down operation. Then, the voltage output from the DC/DC converter 13 is input to the low voltage battery 4 and the in-vehicle device 3, and the low voltage battery 4 is charged and power is supplied to the in-vehicle device 3. The controller 20 makes the inverter 12 operate.

On the other hand, when an abnormality in the DC/DC converter 13 occurs, in step S5, the input voltage V detected by the voltage detector 19 is lower than the pre-charge completion reference voltage Va. When the input voltage V detected by the voltage detector 19 is lower than the pre-charge completion reference voltage Va (step S5: YES), the controller 20 opens the pre-charge relay 18 (step S9) and then performs the abnormality response process (step S10). For example, as the abnormality response process, the controller 20 lights a notification lamp provided on an instrument panel of the vehicle, and notifies the user of the occurrence of the abnormality in the DC/DC converter 13. As a result, the user can recognize the occurrence of the abnormality in the DC/DC converter 13.

As described above, in the vehicle control device 11 of the embodiment of the present invention, after the pre-charge of the inverter 12 is started, when the determination standby time Pw elapses from the time when the input voltage V detected by the voltage detector 19 reaches the step-down operation lower limit voltage Vb, the controller 20 detects the occurrence of the abnormality in the DC/DC converter 13 by determining whether the input voltage V detected by the voltage detector 19 is lower than the pre-charge completion reference voltage Va. This determination can be implemented by using the voltage detector 19, as a means for determining the completion of the pre-charge, provided in the existing vehicle control device, and by adding or changing a computer program executed by the controller 20. That is, this determination can be implemented by adding or changing software to the existing vehicle control device, and in implementing this determination, there is no need to add new hardware to the existing vehicle control device. Therefore, according to the vehicle control device 11 of the present embodiment, it is possible to inexpensively detect the abnormality in the DC/DC converter 13.

Further, according to the vehicle control device 11 of the present embodiment, it is possible to detect the occurrence of the abnormality in the DC/DC converter 13 during the pre-charge of the inverter 12 performed when the power switch 5 of the vehicle is set to the on state. Therefore, when the occurrence of the abnormality in the DC/DC converter 13 is detected, for example, the notification lamp provided on the instrument panel of the vehicle is lighten to notify the occurrence of the abnormality in the DC/DC converter 13. Therefore, it is possible to reliably notify the user of the occurrence of the abnormality in the DC/DC converter 13 when the user prepares for traveling by setting the power switch 5 of the vehicle to the on state.

In the vehicle control device 11 of the present embodiment, the controller 20 detects the occurrence of the abnormality in the DC/DC converter 13 based on the decrease in the input voltage V due to the pre-charge current flowing into the DC/DC converter 13 from an input side of the DC/DC converter 13. The decrease in the input voltage V due to the pre-charge current flowing into the DC/DC converter 13 from the input side thereof occurs regardless of output characteristics such as a maximum output or an output voltage value of the DC/DC converter 13. In particular, since when the DC/DC converter 13 is an isolated type, the input side and an output side thereof are electrically isolated by an internal transformer, the decrease in the input voltage V due to the pre-charge current flowing into the DC/DC converter 13 from the input side thereof is not easily affected by the output characteristics of the DC/DC converter 13. Therefore, according to the vehicle control device 11 of the present embodiment, it is possible to reduce a decrease in detection accuracy of the occurrence of the abnormality in the DC/DC converter 13 due to the output characteristics of the DC/DC converter 13.

In the vehicle control device 11 of the present embodiment, after the pre-charge of the inverter 12 is started, the controller 20 determines whether the input voltage V is lower than the pre-charge completion reference voltage Va at the time when the determination standby time Pw elapses from the time when the input voltage V reaches the step-down operation lower limit voltage Vb. Therefore, in FIGS. 2A and 2B, when a time between the time point t1 when the pre-charge is started and the time point t2 when the input voltage V reaches the step-down operation lower limit voltage Vb varies due to the influence of, for example, an environment in which the vehicle control device 11 is disposed, similar to the variation, the time point t5 when the determination standby time Pw elapses from the time point t2 when the input voltage V reaches the step-down operation lower limit voltage Vb also varies. Therefore, it is possible to suppress a timing at which the decrease in the input voltage V due to the pre-charge current flowing into the DC/DC converter 13 occurs and a timing at which the controller 20 determines the decrease in the input voltage V from becoming inconsistent due to the influence of the environment or the like in which the vehicle control device 11 is disposed, when an abnormality in the DC/DC converter 13 occurs. Therefore, the detection accuracy of the occurrence of the abnormality in the DC/DC converter 13 can be improved.

In the vehicle control device 11 of the present embodiment, the determination standby time Pw is set by adding the additional time Pc to the time required to start step-down operation Pb, the controller 20 determines whether the input voltage V detected by the voltage detector 19 is lower than the pre-charge completion reference voltage Va at the time when the determination standby time Pw elapses from the time when the input voltage V detected by the voltage detector 19 reaches the step-down operation lower limit voltage Vb. Therefore, it is possible to surely match the timing at which the decrease in the input voltage V due to the pre-charge current flowing into the DC/DC converter 13 occurs with the timing at which the controller 20 determines the decrease in the input voltage V when the abnormality in the DC/DC converter 13 occurs, and the detection accuracy of the occurrence of the abnormality in the DC/DC converter 13 can be improved.

In the vehicle control device 11 of the present embodiment, in comparing the input voltage V detected by the voltage detector 19 with the input voltage V when the pre-charge of the inverter 12 is completed at the time point t5 in FIG. 2A or FIG. 2B, the controller 20 uses the pre-charge completion reference voltage Va as a reference voltage corresponding to the input voltage V when the pre-charge of the inverter 12 is completed. As a result, the occurrence of the abnormality in the DC/DC converter 13 can be easily detected.

In the above embodiment, after the pre-charge of the inverter 12 is started, when the determination standby time Pw elapses from the time when the input voltage V detected by the voltage detector 19 reaches the step-down operation lower limit voltage Vb, the controller 20 determines whether the input voltage V detected by the voltage detector 19 is lower than the pre-charge completion reference voltage Va However, the present invention is not limited thereto. For example, in FIGS. 2A and 213, when a time variation range between the time point t1 at which the pre-charge starts and the time point t2 when the input voltage V reaches the step-down operation lower limit voltage Vb can be predicted in advance, a total time from the time point t1 to the time point t5 may be set in advance, and the decrease in the input voltage V may be determined when the total time elapses from the time point t1 when the pre-charge of the inverter 12 is started and the time reaches the time point t5, In the above embodiment, in FIG. 2A, after the pre-charge is started at the time point t1, the input voltage V reaches the step-down operation lower limit voltage Vb at the time point t2, and at the time point t4 when the time required to start step-down operation Pb elapses from the time point t2, the pre-charge of the inverter 12 is completed. However, there is a case that the pre-charge of the inverter 12 may not be completed at the time when the input voltage V reaches the step-down operation lower limit voltage Vb and the time required to start step-down operation Pb elapses after the pre-charge is started. In this case, the determination of the decrease in the input voltage V can be surely made after the completion of the pre-charge of the inverter 12 by lengthening the additional time In the above embodiment, the controller 20 outputs the operation control signal at the ground level when the state of the DC/DC converter 13 is set to the state where the power supplied from the low voltage battery 4 is received, and outputs the operation control signal at the non-ground level when the state of the DC/DC converter 13 is set to the state where the power supplied from the low voltage battery 4 is cut off. However, the controller 20 may output the operation control signal at the non-ground level when the state of the DC/DC converter 13 is set to the state where the power supplied from the low voltage battery 4 is received, and may output the operation control signal at the ground level when the state of the DC/DC converter 13 is set to the state where the power supplied from the low voltage battery 4 is cut off. In this case, the abnormality in the DC/DC converter 13 occurs for some reason when a constant current flows from an outside into the path for sending the operation control signal from the controller 20 to the DC/DC converter 13, or the like.

In the above embodiment, the case where the power supply to the DC/DC converter 13 cannot be stopped normally due to the ground fault of the path for sending the operation control signal from the controller 20 to the DC/DC converter 13 is described, but the reason why the power supplied to the DC/DC converter 13 is not normally stopped is not limited. Further, the DC/DC converter 13 is not limited to the isolated type.

The present invention can be modified as appropriate without departing from the spirit or concept of the invention that can be read from the claims and the entire description, and the vehicle control device accompanying such a modification is also included in the technical concept of the present invention.

What is claimed is:

1. A vehicle control device that is configured to control an electric vehicle, the electric vehicle comprising an electric motor that is a driving power source, a high voltage battery that is configured to output a high voltage for driving the electric motor, an in-vehicle device that is configured to operate at a low voltage, and a low voltage battery that is configured to output the low voltage for operating the in-vehicle device, the vehicle control device comprising:
an inverter that is configured to drive the electric motor using a voltage output from the high voltage battery;
a DC/DC converter that is configured to step down the voltage output from the high voltage battery and that is configured to output a voltage used for charging the low voltage battery or operating the in-vehicle device;
a main switch that is configured to switch an input of the voltage output from the high voltage battery to the inverter and the DC/DC converter between on and off states;
a pre-charge circuit including a pre-charge current generator that is configured to generate a pre-charge current using a current output from the high voltage battery, and a pre-charge switch that is configured to switch an input of the pre-charge current to the inverter between on and off states;
a voltage detector that is configured to detect an input voltage input from the high voltage battery to the inverter and the DC/DC converter; and
a controller that is configured to input the pre-charge current to the inverter to start pre-charge of the inverter by setting the main switch to the off state and the pre-charge switch to the on state, and that is configured to set the main switch to the on state and the pre-charge switch to the off state after the pre-charge of the inverter is completed, wherein
the inverter and the DC/DC converter are connected to the high voltage battery in parallel with each other,
the main switch and the pre-charge circuit are connected in parallel with each other on the way of a path through which the high voltage battery is connected to the inverter and the DC/DC converter,
after the pre-charge of the inverter is completed, the controller is configured to determine whether the input voltage detected by the voltage detector is lower than the input voltage input from the high voltage battery to the inverter and the DC/DC converter at a time when the pre-charge of the inverter is completed before the main switch is set to the on state and the pre-charge switch is set to the off state, and when the input voltage detected by the voltage detector is lower than the input voltage input from the high voltage battery to the inverter and the DC/DC converter at the time when the pre-charge of the inverter is completed, the controller is configured to determine that power supplied from a power supply of the DC/DC converter to the DC/DC converter is not normally stopped.

2. The vehicle control device according to claim 1, wherein when a lower limit value of the input voltage of the DC/DC converter at which the DC/DC converter is capable of stepping down the input voltage and outputting a stepped-down voltage is referred to as a step-down operation lower limit voltage, and when a time required from inputting a voltage equal to or higher than the step-down operation lower limit voltage to the DC/DC converter in a state where no voltage equal to or higher than the step-down operation lower limit voltage is input, to the DC/DC converter stepping down the input voltage and outputting the stepped-down voltage is referred to as a time required to start step-down operation, after the pre-charge of the inverter is started, and then the time required to start step-down operation elapses from a time when the input voltage detected by the voltage detector reaches the step-down operation lower limit voltage and the pre-charge of the inverter is completed, the controller is configured to determine whether the input voltage detected by the voltage detector is lower than the input voltage input from the high voltage battery to the inverter and the DC/DC converter at the time when the pre-charge of the inverter is completed before the main switch is set to the on state and the pre-charge switch is set to the off state.

3. The vehicle control device according to claim 1, wherein when a lower limit value of the input voltage of the DC/DC converter at which the DC/DC converter is capable of stepping down the input voltage and outputting a stepped-down voltage is referred to as a step-down operation lower limit voltage, and when a time required from inputting a voltage equal to or higher than the step-down operation lower limit voltage to the DC/DC converter in a state where no voltage equal to or higher than the step-down operation lower limit voltage is input, to the DC/DC converter stepping down the input voltage and outputting the stepped-down voltage is referred to as a time required to start step-down operation, after the pre-charge of the inverter is started, and then a determination standby time elapses from a time when the input voltage detected by the voltage detector reaches the step-down operation lower limit voltage and the pre-charge of the inverter is completed, the controller is configured to determine whether the input voltage detected by the voltage detector is lower than a lower limit value of a normal discharge voltage of the high voltage battery, before the main switch is set to the on state and the pre-charge switch is set to the off state, and the determination standby time is a time obtained by adding a predetermined additional time to the time required to start step-down operation.

* * * * *